Dec. 26, 1950     H. E. CAFFREY     2,535,265
VEHICLE LICENSE PLATE WITH RENEWABLE TAB
Filed Feb. 17, 1948     2 Sheets-Sheet 1
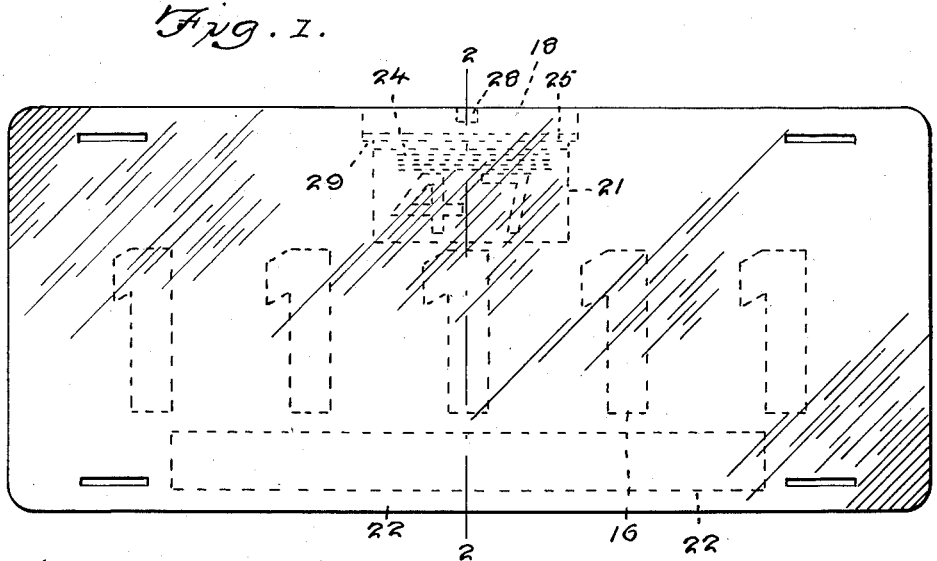
INVENTOR.
Howard E. Caffrey
BY Victor J. Evans & Co.
ATTORNEYS

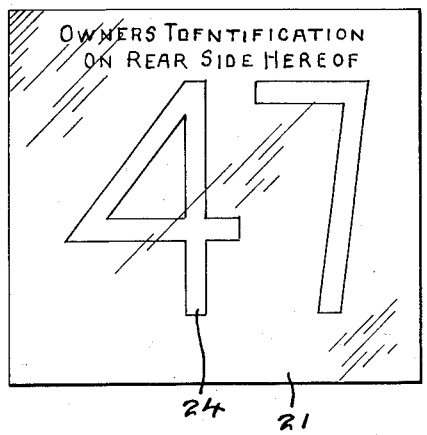
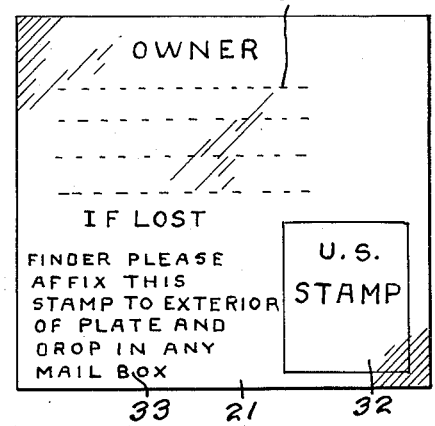
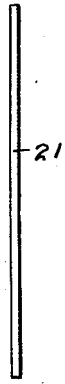
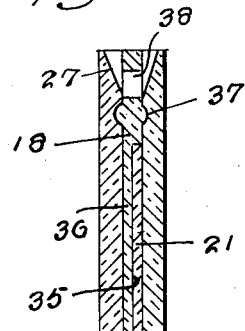
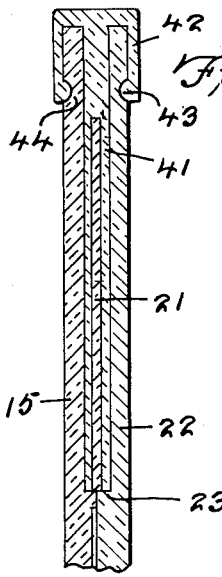
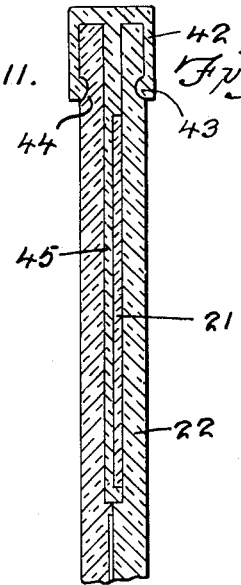
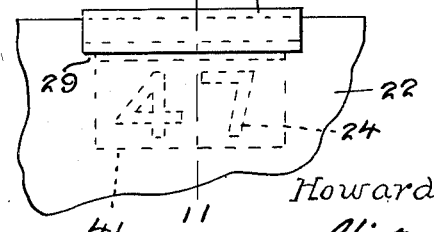

Patented Dec. 26, 1950

2,535,265

UNITED STATES PATENT OFFICE 2,535,265

VEHICLE LICENSE PLATE WITH RENEWABLE TAB

Howard E. Caffrey, Tucson, Ariz.

Application February 17, 1948, Serial No. 8,926

5 Claims. (Cl. 40—125)

1

This invention relates to license plates, signs and display devices.

It is among the objects of the present invention to provide a long life, practically indestructible vehicle license plate or the like wherein economy is had in the original permanent issuance of plate and subsequent annual issuing of inexpensive renewal tabes, in the use of materials, wherein quick and simple exchange of old and new tabs can be effected by the owner, wherein the painted numerals on the permanent plate as well as numerals and printing on the renewal tab will be enclosed and sealed in and thereby protected from the weather or other defacing agencies and wherein the coloring combination may have decided contrasts.

It is another object of the present invention to provide a license plate construction wherein the renewable tab will be sealed in or confined within the plate.

Other objects of the invention are to provide a renewal tab license plate construction, which is simple, inexpensive to manufacture, weather proof, sturdy and compact, convenient to use and efficient in operation.

For a better understanding of the invention, reference may be had to the following detailed description taken in connection with the accompanying drawing, in which Fig. 1 is a front face view of the renewal tab license plate embodying the features of the present invention, Fig. 2 is an enlarged sectional view, in elevation, taken on line 2—2 of Fig. 1, Fig. 3 is an enlarged fragmentary and sectional view looking upon the front face of the renewal tab with its year numerals and upon the front face of the back plate with its permanent license numbers, the view being taken on line 3—3 of Fig. 2, Fig. 4 is an end elevational view of the renewal tab, Fig. 5 is a top plan view of the edge of the construction showing the opening for receiving the renewal tab, Figs. 6, 7 and 8 are respectively front face, rear face and side edge views of the tab, Fig. 9 is a sectional view of a license plate embodying a modified form of tab holder, Fig. 10 is a fragmentary front elevational view of a modified form of tab, Fig. 11 is a sectional view taken on line 11—11 of Fig. 10, Fig. 12 is a sectional view of a modified form of tab holder similar to the form shown in Figs.

2

10 and 11 but employing a different arrangement for retaining the tab.

Referring now particularly to Figures 1 to 5, 15 represents a back plate on which numerals 16 are imposed with paint, ink, or other material or even with luminous material so that the numbers may be read at night. The plate 15 is recessed as indicated at 17 to receive the back of a tab holder 18 having a slot 19 for renewably receiving an annual tab 21, Figs. 6, 7 and 8. Over the back plate 15 there is disposed a transparent front plate 22 having its rear face shaped similarly to the front face of the back plate 15. This plate 22 is permanently sealed by cement material or other suitable means with the plate 15 whereby to give protection to the painted numerals 16 on the plate 15. The plate 22 has a recess 23 for receiving the holder. The back plate 15 and the front plate 22 coact to define a housing, while the recesses 17 and 23 coact to define a socket.

The holder 18 is formed of transparent material so that the lettering as indicated at 24 may be read through the holder. The upper part of the holder 18 is provided with sealing beads 25 on opposite sides of the same and adapted to respectively enter grooves 26 disposed respectively in the plates 15 and 22. When the tab holder is inserted within the plates or the recesses thereof it will be sealed at its upper edge to prevent the influx of foreign matter. The recesses 17 and 23 have respectively notches 27 to permit the insertion of a tool for engagement with an opening 28 in the holder whereby the holder can be readily lifted out of the recesses 17 and 23 in the plates. The recesses 17 and 23 are widened at their upper ends to receive extensions or shouldered portions 29 of the holder 18.

The tab 21 may be formed of plastic material, paper, cardboard, or of metal and can be of any desired color with the numerals 24 of a color in contrast thereto and may have one or more folds for enlargement. The reverse side of the tab 21 can have space 31 for the car owners identification and address. The tab may further have a space 32 for receiving a stamp and also may have directions 33 for advising the finder of the plate in case the plate has been lost.

In Figure 9, there is shown a modified form of holder wherein instead of a slot within the holder for receiving the tab there is provided a recess 35 in the front face of holder 36 disposed within the recesses 17 and 23 of the plates. The holder is formed at its upper end similar to the holder 18 and has beads 37 and a lifting opening 38.

In Figures 10, 11 and 12, there is shown tab holders which are formed to receive the tabs in the same manner as above described but wherein the manner of retaining the holder on the edge of the plate is different. In Figures 10 and 11, a holder 41 is employed which has a slot for receiving tab 21. Instead of providing beads on the upper part of the tab holder, overhanging and downwardly bent flanges 42 are provided which can support, seal and protect the holder within the recesses. These flanges have inwardly extended beads 43 adapted to cooperate with grooves 44 respectively upon the exterior faces of the plates 15 and 22.

In Figure 12, the same means for securing the sealing of the holder as provided in Figure 11, to the plates is provided by the tab 21 being retained in a recess 45 of the holder.

While various changes may be made in the detail construction, it shall be understood that such changes shall be within the spirit and scope of the present invention as defined by the appended claims.

What is claimed is:

1. In a license plate construction, a housing including a back plate and a transparent front plate arranged in superposed relation with respect to said back plate and secured thereto, there being a recess arranged in each of said plates, said recesses coacting to define a socket, a transparent holder seated in said socket and provided with a slot, a tab having indicia thereon removably positioned in said slot, a pair of sealing beads projecting from said holder, there being an opposed groove arranged in each of said plates for receiving therein said beads.

2. In a license plate construction, a housing including a back plate and a transparent front plate arranged in superposed relation with respect to said back plate and secured thereto, there being a recess arranged in each of said plates, said recesses coacting to define a socket, a transparent holder seated in said socket and provided with a slot, a tab having indicia thereon removably positioned in said slot, a pair of sealing beads projecting from said holder, there being an opposed groove arranged in each of said plates for receiving therein said beads, said housing being provided with a pair of opposed notches for receiving a tool whereby said holder can be lifted from said socket.

3. In a license plate construction, a housing including a back plate and a transparent front plate arranged in superposed relation with respect to said back plate and secured thereto, there being a recess arranged in each of said plates, said recesses coacting to define a socket, a transparent holder seated in said socket and provided with a slot, said slot extending upwardly from the lower edge of said holder and positioned between the front and back of said holder, a pair of sealing beads projecting from said holder, there being an opposed groove arranged in each of said plates for receiving therein said beads.

4. In a license plate construction, a housing including a back plate and a transparent front plate arranged in superposed relation with respect to said back plate and secured thereto, there being a recess arranged in each of said plates, said recesses coacting to define a socket, a transparent holder seated in said socket and provided with a slot, a tab having indicia thereon removably positioned in said slot, said slot being arranged in the front face of said holder, a pair of sealing beads projecting from said holder, there being an opposed groove arranged in each of said plates for receiving therein said beads.

5. In a license plate construction, a housing including a back plate and a transparent front plate arranged in superposed relation with respect to said back plate and secured thereto, there being a recess arranged in each of said plates, said recesses coacting to define a socket, a transparent holder seated in said socket and provided with a slot, a tab having indicia thereon removably positioned in said slot, said slot being arranged in the front face of said holder, flanges connected to the upper end of said holder and overlying said front and back plates, beads arranged on the lower end of said flanges, there being a groove arranged in each of said plates for receiving therein said beads.

HOWARD E. CAFFREY.

REFERENCES CITED

The following references are of record in the file of this patent:

UNITED STATES PATENTS

| Number | Name | Date |
| --- | --- | --- |
| 1,495,078 | Keefer | May 20, 1924 |
| 1,568,674 | Knowles | Jan. 5, 1926 |
| 1,621,810 | Rice | Mar. 22, 1927 |
| 1,911,095 | Sneierson | May 23, 1933 |
| 2,000,419 | Sarber | May 7, 1935 |
| 2,156,753 | Dunnam et al. | May 2, 1939 |
| 2,330,080 | Palmer | Sept. 21, 1943 |
| 2,361,479 | Joffo | Oct. 31, 1944 |
| 2,364,870 | Otto | Dec. 12, 1944 |
| 2,400,079 | Ducey | May 14, 1946 |

FOREIGN PATENTS

| Number | Country | Date |
| --- | --- | --- |
| 460,601 | Germany | Apr. 7, 1926 |